(12) United States Patent
Yoon et al.

(10) Patent No.: US 8,249,836 B2
(45) Date of Patent: Aug. 21, 2012

(54) SIMULATION SYSTEM FOR FACTS CONNECTED ONLINE TO SCADA SYSTEM

(75) Inventors: Jong-Su Yoon, Daejeon Metropolitan (KR); Byung-Hoon Chang, Daejeon Metropolitan (KR); Soo-Yeol Kim, Daejeon Metropolitan (KR); Seung-Pil Moon, Daejeon Metropolitan (KR); Jeong-Yuel Han, Daejeon Metropolitan (KR)

(73) Assignee: Korea Electric Power Corporation, Seoul (KR)

( * ) Notice: Subject to any disclaimer, the term of this patent is extended or adjusted under 35 U.S.C. 154(b) by 568 days.

(21) Appl. No.: 11/851,682

(22) Filed: Sep. 7, 2007

(65) Prior Publication Data

US 2008/0103737 A1 May 1, 2008

(30) Foreign Application Priority Data

Oct. 31, 2006 (KR) .................. 10-2006-0106508

(51) Int. Cl.
*G06F 17/00* (2006.01)
(52) U.S. Cl. ............ 703/2; 703/4; 703/13; 703/14
(58) Field of Classification Search ........... 703/4, 13, 703/14, 18, 2; 700/1, 9, 15; 323/205
See application file for complete search history.

(56) References Cited

U.S. PATENT DOCUMENTS

| | | | | |
|---|---|---|---|---|
| 5,343,139 A * | 8/1994 | Gyugyi et al. | | 323/207 |
| 5,469,044 A * | 11/1995 | Gyugyi et al. | | 323/207 |
| 5,698,969 A * | 12/1997 | Gyugyi | | 323/207 |
| 5,808,452 A * | 9/1998 | Gyugyi et al. | | 323/207 |
| 6,313,752 B1 * | 11/2001 | Corrigan et al. | | 340/657 |
| 6,625,520 B1 * | 9/2003 | Chen et al. | | 700/286 |
| 6,799,080 B1 * | 9/2004 | Hylden et al. | | 700/97 |
| 6,901,299 B1 * | 5/2005 | Whitehead et al. | | 700/22 |
| 7,117,070 B2 * | 10/2006 | Chow et al. | | 700/297 |
| 7,177,727 B2 * | 2/2007 | Chu et al. | | 700/287 |
| 7,233,843 B2 * | 6/2007 | Budhraja et al. | | 700/291 |
| 7,321,834 B2 * | 1/2008 | Chu et al. | | 702/60 |
| 7,343,360 B1 * | 3/2008 | Ristanovic et al. | | 705/412 |
| 7,526,794 B2 * | 4/2009 | Chand et al. | | 726/2 |
| 7,642,757 B2 * | 1/2010 | Yoon et al. | | 323/205 |
| 2004/0039490 A1 * | 2/2004 | Kojima et al. | | 700/287 |
| 2004/0083087 A1 * | 4/2004 | Rehtanz et al. | | 703/18 |
| 2004/0088060 A1 * | 5/2004 | Renou et al. | | 700/30 |

(Continued)

FOREIGN PATENT DOCUMENTS

JP 09-182319 7/1997

(Continued)

OTHER PUBLICATIONS

Ong et al., "Java-based applications for accessing power system via intranet, extranet and internet", 2001, pp. 273-284.*

(Continued)

*Primary Examiner* — David Silver
*Assistant Examiner* — Kibrom Gebresilassie
(74) *Attorney, Agent, or Firm* — McDermott Will & Emery LLP

(57) ABSTRACT

An online simulation system for a flexible AC transmission system (FACTS) which is capable of analyzing operation control effect of the FACTS in advance through an online data connection with a supervisory control and data acquisition (SCADA) system used for operating an electric power system.

5 Claims, 1 Drawing Sheet

U.S. PATENT DOCUMENTS

| | | | |
|---|---|---|---|
| 2005/0014561 A1 | 1/2005 | Ouchi | |
| 2005/0033481 A1* | 2/2005 | Budhraja et al. | 700/286 |
| 2005/0071050 A1* | 3/2005 | Chow et al. | 700/286 |
| 2005/0160128 A1* | 7/2005 | Fardanesh | 708/446 |
| 2007/0027642 A1* | 2/2007 | Chu et al. | 702/60 |
| 2007/0250217 A1* | 10/2007 | Yoon et al. | 700/286 |
| 2010/0094477 A1* | 4/2010 | Berggren et al. | 700/297 |
| 2010/0100250 A1* | 4/2010 | Budhraja et al. | 700/291 |

FOREIGN PATENT DOCUMENTS

KR  10-2003-0085675 A  11/2003

OTHER PUBLICATIONS

M. Larson, C. Rehtanz, D. Westermann, "Improvement of Cross border Trading Capabilities through Wide are Control of FACTS", Bulk Power System Dynamics and Control, Aug. 22-27, 2004, pp. 80-87.*

Y. S. Ong, H. B. Gooi, S. F. Lee, "Java-based applications for accessing power system data via intranet, extranet and internet" pp. 273-284, Elsevier 2001.*

M. Larsson, R. Gardner, C. Rehtanz, "Interactive Simulation and Visualization of Wide Area Monitoring and Control Applications", pp. 1-6, 2005.*

S. J. Ahn, D. W. Lee, S. Moon, J. s. Yoon, B. H. Chang, S. Y. Kim, and S. P. Moon, "Automatic and Supervisory Control System for KEPCO UPFC", pp. 1-5, 2006.*

Y.S. Ong et al., H. B. Gooi, S.F.Lee, "Java-based applications for accessing power system data via intranet, extranet and internet" pp. 273-284, 2001.*

B. H. Chang, J. B. Choo, J. M. Kim, D. W. Han, S. moon, K. K. Koh, "Development of FACTS Operation technology to the KEPCO Power Network", pp. 2014-2018, IEEE 2002.*

* cited by examiner

SIMULATION SYSTEM FOR FACTS CONNECTED ONLINE TO SCADA SYSTEM

BACKGROUND OF THE INVENTION

1. Field of the Invention

The present invention relates to a simulation system for a flexible AC transmission system (FACTS) connected online to a supervisory control and data acquisition (SCADA) system, and more particularly to an online simulation system for a FACTS which is capable of previously analyzing operation control effect of the FACTS through an online data connection with a SCADA system used for operating an electric power system.

2. Description of the Related Technology

Since a FACTS such as a static synchronous compensator (STATCOM), a static synchronous series compensator (SSSC) or a unified power flow controller (UPFC) is operated based on a electronic inverter, it is possible to actively control an power load and a bus voltage of the power system with fast speed and to improve stability and efficiency of the power system.

However, since a conventional method of controlling FACTS is a manual set-point control method of allowing an operator of a power substation including the FACTS mounted therein or a local load dispatch center including a SCADA mounted therein to control the FACTS with his/her experience and intuition according to the status of a peripheral power system, there is a limitation in optimal operation and a variety of control. When the status of the power system is changed or the power system should be controlled so as to satisfy a special requirement, the FACTS cannot be appropriately controlled by only the experience and intuition of the operator. In particular, since the control effect of the FACTS has influence on an actual system, the selection of a control set-point is very important.

However, if the operator of the FACTS can check the effect on the power system in advance due to the control of the FACTS through a simulator, the operation of the FACTS becomes easy and system control reliability is remarkably improved.

In the related technology relating to a simulator for a FACTS, since a FACTS is a new technology, a simulator for a FACTS is hardly developed. Examples of the simulator for the FACTS include, for example, an offline simulator which is not connected to an external system such as a SCADA system. In this simulator, analysis is performed on the basis of power system data stored in the simulator. Since the offline simulator is not connected online to the SCADA system, the offline simulator does not aid the operator to control FACTS, unlike the present invention. Therefore, the offline simulator is developed for the purpose of education only.

SUMMARY OF THE INVENTION

Therefore, the present invention has been made in view of the above problems, and it is an object of the present invention to provide an online simulation system capable of performing load flow computation through online real-time system data received from a SCADA system and a FACTS control set-point input by an operator so as to immediately check FACTS control effect according to control set-point, and acquiring an optimal FACTS control set-point.

In accordance with the present invention, the above and other objects can be accomplished by the provision of a simulation system for FACTS connected online to a SCADA, including: the SCADA which periodically acquires power system line data; and a FACTS simulator which receives the power system line data from the SCADA and performs load flow computation of an power system, and includes a database server for receiving and storing the power system line data from the SCADA, a man machine interface (MMI) for allowing an operator to input a FACTS control set-point, a load flow computation analysis module for performing the load flow computation of the power system on the basis of the power system line data received from the database server and the control set-point received from the MMI, and a power system display module for displaying the analyzed result of the load flow computation analysis module. Here, the power system line data may include bus voltage, real and reactive power flow, and an operation information of a circuit breaker and a relay.

The MMI of the simulator is used to input control set-points of the FACTS which is being operated in the power system, and the control set-points include a bus voltage, real and reactive power flow if the FACTS is a UPFC. The MMI of the simulator sends these control set-points to the load flow computation module. The load flow computation module performs the load flow analysis on the basis of the inputted power system data and the FACTS control set-points and sends the result to the power system display module. The power system display module displays voltages of buses and power flow of transmission lines and is fundamentally similar to a SCADA screen.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
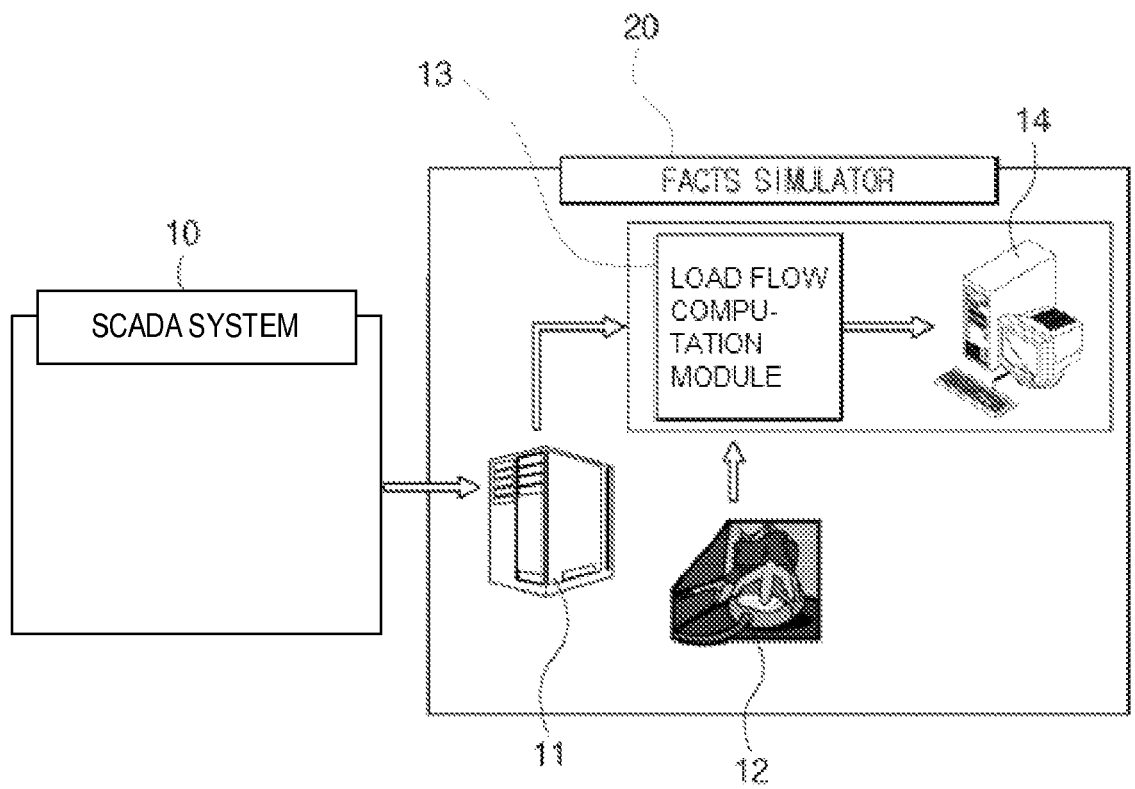
FIG. 1 is a view showing the whole configuration of a simulation system for FACTS connected online to a SCADA according to an embodiment of the present invention.

Hereinafter, a simulation system for a FACTS connected online to a SCADA according to a preferred embodiment of the present invention will be described with reference to the accompanying drawings.

FIG. 1 is a view showing the whole configuration of a simulation system for a FACTS connected online to a SCADA according to an embodiment of the present invention.

As shown in FIG. 1, the simulation system for the FACTS connected online to the SCADA according to the present invention includes a SCADA 10 and a FACTS simulator 20 which receives power system line data from the SCADA 10 and performs load flow computation of an power system. The FACTS simulator 20 includes a database server 11, a man machine interface (MMI) 12, a load flow computation module 13 and a system display module 14.

The SCADA system 10 periodically acquires the power system line data in accordance with an update period. The power system line data acquired by the SCADA 10 is required for the FACTS simulator. For example, the power system line data includes, for example, analog data such as bus voltage data, real and reactive power flow data, or digital data related to operation information of a circuit breaker or a relay.

The database server 11 of the FACTS simulator 20 receives and stores the power system line data acquired by the SCADA 10. The database server 11 is connected online to the SCADA 10 to receive and store the power system line data in real time.

The power system line data stored by the database server 11 is sent to the load flow computation module 13. When the database server 11 sends the power system line data to the load flow computation module 13, the power system line data is converted into an input data format of a load flow computation algorithm mounted in the load flow computation module 13. The load flow computation module 13 previously includes FACTS(STATCOM, SSSC and UPFC) load flow models in the algorithm. The load flow computation module 13 receives a FACTS control set point according to the operation of an operator from MMI 12, in addition to the power system line data of the database server 11. If the FACTS device is the UPFC, the MMI 12 sends a control set-point relating to a bus voltage, real and reactive power flow to the load flow computation analysis module 13.

When the operator directly inputs the control set-point required for the FACTS through the MMI 12, the input control set-point is converted into a control input value of the FACTS load flow computation model included in the load flow computation module 13 and the converted control input value is then sent to the load flow computation module 13.

The load flow computation module 13 performs general load flow computation on the basis of the power system line data received from the database server 11 and the control set-point received from the MMI 12.

The analyzed result of the load flow computation analysis module 13 is displayed on the power system display module 14. At this time, load flow computation information displayed on the power system display module 14 includes voltages and phases of the buses and power flow values of transmission lines. Such load flow computation information indicates the effect of the FACTS in a steady state of the power system according to the control of the FACTS set-point.

As described above, according to the present invention, it is possible to provide a simulation system capable of analyzing power system control effect according to a FACTS control set-point selected by an operator and performing load flow computation of an electric power system using a FACTS model based on an input control set-point and real-time data of a SCADA system such that FACTS control effect is immediately checked. Accordingly, it is possible to improve control effect and control reliability of the FACTS.

According to a simulation system for a FACTS connected online to a SCADA system of the embodiment of the present invention, an operator of a FACTS can analyze system control effect in advance according to a control set-point and thus the operation effect due to optimal operation of the FACTS can be improved and operation reliability of the FACTS can be improved.

In addition, the simulation system can function as an operation assisting system of a FACTS operator of an electric power company or function as an education simulator capable of improving operation capability of the FACTS operator through a simulation function.

Although the preferred embodiments of the present invention have been disclosed for illustrative purposes, those skilled in the technology will appreciate that various modifications, additions and substitutions are possible, without departing from the scope and spirit of the invention as disclosed in the accompanying claims.

What is claimed is:

1. A simulation system for a flexible AC transmission system (FACTS) connected online to a supervisory control and data acquisition (SCADA) system, comprising:
   the SCADA system which periodically acquires power system line data; and
   a FACTS simulator which receives the power system line data from the SCADA and performs load flow computation of an electric power system, and includes:
      a database server for receiving and storing the power system line data from the SCADA system,
      a man machine interface (MMI) for inputting a simulation FACTS control set-point,
      a load flow computation module for performing the load flow computation of the electric power system on the basis of the power system line data received from the database server and the control set-point received from the MMI, wherein the load flow computation module includes a load flow computation algorithm, the load flow computation algorithm having FACTS load flow computation models for types of FACTS devices, the types of FACTS devices comprising a static synchronous compensator (STATCOM), a static synchronous series compensator (SSSC) and a unified power flow controller (UPFC), and the load flow computation module performs the load flow computation of the electric power system depending upon the FACTS load flow computation models, and
      a power system display module for displaying the analyzed result of the load flow computation module,
   wherein the database server converts the power system line data from the SCADA system into an input data format of the load flow computation algorithm,
   the control set-point is converted into a control input value of the FACTS load flow computation model included in the load flow computation module and the converted control input value is then sent to the load flow computation module, and
   the MMI sends the control set-point of a bus voltage, a real and reactive electric power load flow to the load flow computation module if the type of FACTS is the UPFC.

2. The system according to claim 1, wherein the system line data includes vision data, bus voltage data, real power load flow data, reactive power load flow data, and data on operation information of a circuit breaker and a protection relay.

3. The system according to claim 2, wherein the database server is connected online to the SCADA system to receive the power system line data in real time.

4. The system according to claim 3, wherein the database server and the SCADA system are connected online to each other through TCT/IP protocol communication.

5. The system according to claim 1, wherein the power system display module displays voltages and phases of buses and electric power load flow values of electric power transmission lines.

\* \* \* \* \*